(12) United States Patent
Lu et al.

(10) Patent No.: US 10,754,445 B2
(45) Date of Patent: Aug. 25, 2020

(54) MOUSE HAVING A MOVABLE PALM REST

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Chun-Te Yu, Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/684,593

(22) Filed: Nov. 15, 2019

(65) Prior Publication Data
US 2020/0209989 A1 Jul. 2, 2020

(30) Foreign Application Priority Data
Dec. 28, 2018 (TW) .............................. 107147813 A

(51) Int. Cl.
*G06F 3/0354* (2013.01)
(52) U.S. Cl.
CPC .. *G06F 3/03543* (2013.01); *G06F 2203/0333* (2013.01)
(58) Field of Classification Search
CPC ............. G06F 3/03541; G06F 3/03543; G06F 2203/03333
See application file for complete search history.

(56) References Cited

U.S. PATENT DOCUMENTS

| 5,762,302 A * | 6/1998 | Myers ................ A47B 21/0371 248/118.5 |
| 5,913,497 A * | 6/1999 | Myers ................ A47B 21/0371 248/118.5 |
| 6,396,478 B1 * | 5/2002 | Kravtin ............... G06F 3/03543 248/118.1 |
| 9,092,073 B1 * | 7/2015 | Wang ................... G06F 3/03543 |
| 2008/0129693 A1 * | 6/2008 | Chen .................... G06F 3/03543 345/157 |
| 2015/0138093 A1 * | 5/2015 | Young ................... G06F 3/0312 345/166 |
| 2018/0011558 A1 * | 1/2018 | Chao ................... G06F 3/03543 |

* cited by examiner

*Primary Examiner* — Christopher J Kohlman
(74) *Attorney, Agent, or Firm* — Li & Cai Intellectual Property Office

(57) ABSTRACT

A mouse having a movable palm rest is provided and includes a mouse body, a bracket, a connector, the movable palm rest, a first sliding component, a second sliding component, a first positioning component and a second positioning component. The mouse body is disposed at a front end of the mouse. The bracket is connected to the rear side of the mouse body, extends along a longitudinal direction from the rear side of the mouse body, and has a contacting surface at a bottom surface of the bracket. The connector is disposed at a rear end of the bracket. The movable palm rest is connected to the connector. The first and the second sliding components are respectively disposed on the movable palm rest and the connector. The first and the second positioning components are respectively disposed on the movable palm rest and the connector.

10 Claims, 9 Drawing Sheets

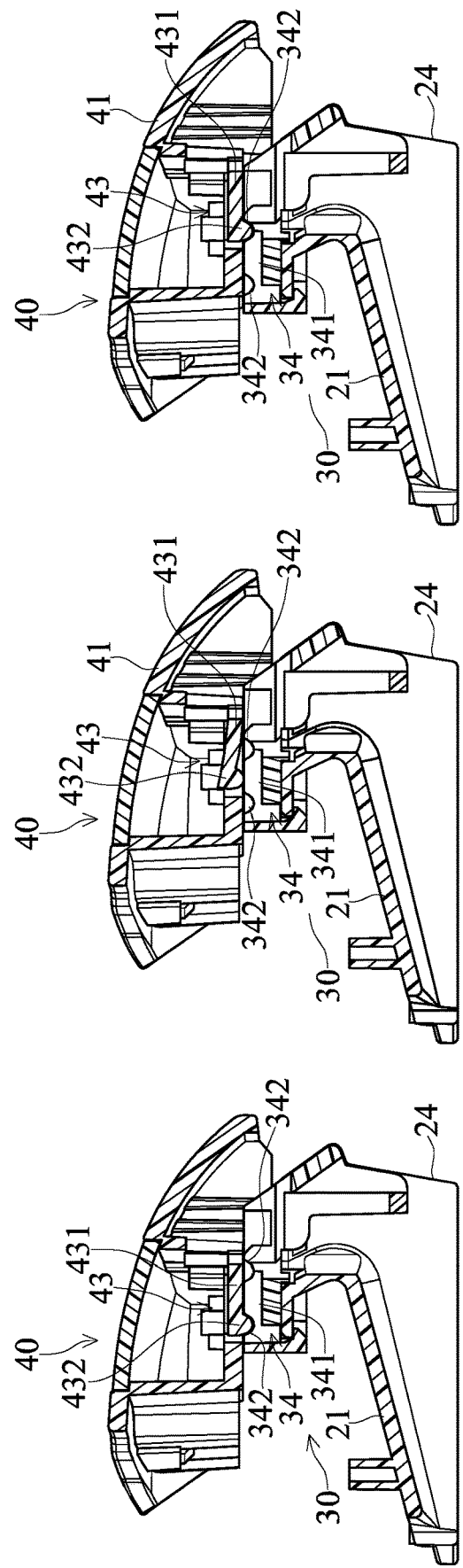

001 # MOUSE HAVING A MOVABLE PALM REST

CROSS-REFERENCE TO RELATED PATENT APPLICATION

This application claims the benefit of priority to Taiwan Patent Application No. 107147813, filed on Dec. 28, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse having a movable palm rest, and more particularly to a mouse having a movable palm rest capable of being adjusted according to a size of a palm of a user.

BACKGROUND OF THE DISCLOSURE

With the use of the graphical user interface (GUI) in present computer operating systems, a mouse has become the most important computer input device. When operating the mouse, the mouse is held by the palm, and buttons and rollers are clicked by the fingers. Therefore, when a user uses the mouse for a long time, the wrist and fingers of the user may be easily fatigued. Accordingly, if the ergonomics of the design of the mouse is poor, the user can easily feel uncomfortable and may bring about chronic wrist or finger joint diseases. The ergonomical requirements in the design of the mouse are especially demanding when used in computer gaming software. If the shape or size of the mouse does not fit with the palm of the user, the response time or the operating accuracy of the mouse will be reduced, and the palm of the user can be easily hurt due to the improper operating posture.

Therefore, more and more high-end mice and E-sports mice value ergonomics in mouse design. However, since the shape of most conventional mice is fixed, the shape of the same mouse will not be able to satisfy the requirements of users with different shapes or sizes of the palm.

According to the aforementioned reasons, there are many drawbacks in the conventional mouse. How the aforementioned drawbacks can be overcome by the improvement of the structure of the mouse has become one of most important issues in the related art.

SUMMARY OF THE DISCLOSURE

One object of the present disclosure is to solve the problem that the shape of the present mouse cannot be adjusted according to the size or shape of the palm of the user, and cannot be fittingly adapted for different users.

In order to solve the aforementioned problem, a mouse having a movable palm rest is provided in one embodiment of the present disclosure and includes a mouse body, a bracket, a connector, the movable palm rest, a first sliding component, a second sliding component, a first positioning component and a second positioning component. The mouse body is disposed at a front end of the mouse, and includes a top surface, a bottom surface, a front side and a rear side, and the top surface is opposite to the bottom surface and the front side is opposite to the rear side. The bracket is connected to the rear side of the mouse body, extends along a longitudinal direction from the rear side of the mouse body and away from the mouse body, and has a contacting surface at a bottom surface of the bracket. The contacting surface and the bottom surface of the mouse body are coplanar with each other. The connector is disposed at a rear end of the bracket. The movable palm rest is connected to the connector. The first sliding component is disposed on one of the movable palm rest and the connector, while the second sliding components is disposed on the other of the movable palm rest and the connector, and the first sliding component and the second sliding component are capable of being slidingly coupled together. The first sliding component and the second sliding component define a movement path and guide the movable palm rest to move forward and backward along the movement path so as to change a distance between the movable palm rest and the mouse body. The first positioning component is disposed on one of the movable palm rest and the connector, the second positioning component is disposed on the other one of the movable palm rest and the connector, and the first positioning component and the second positioning component are capable of cooperating with each other to selectively position the movable palm rest at a plurality of positioning locations on the movement path.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which:

FIG. 9, FIG. 10 and FIG. 11 are schematic views of the first positioning component and the second positioning component of the present disclosure in continuous motion, respectively.

DETAILED DESCRIPTION OF THE EXEMPLARY EMBODIMENTS

Figure 1:
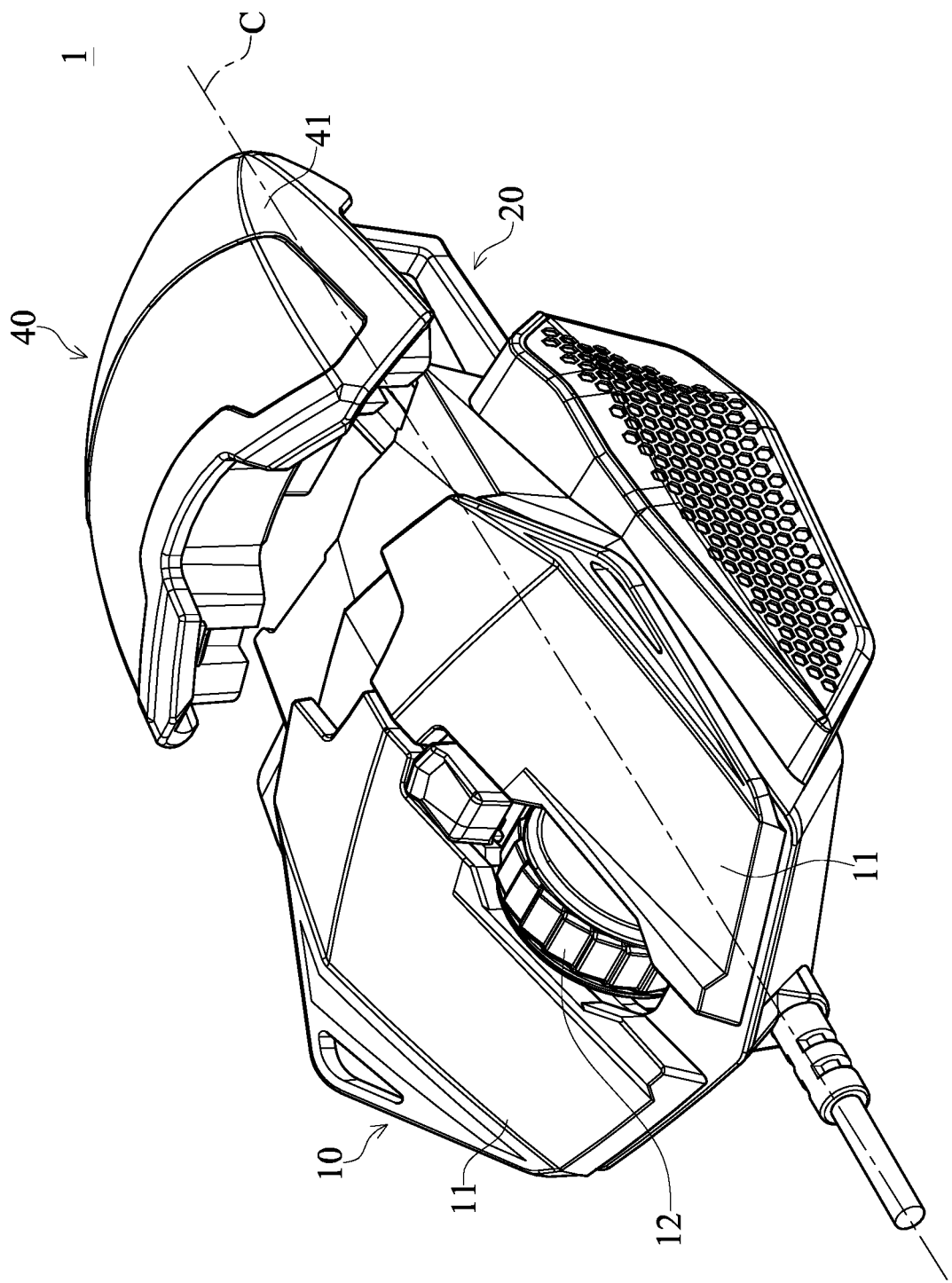
FIG. 1 is a perspective assembly view of a mouse having a movable palm rest in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
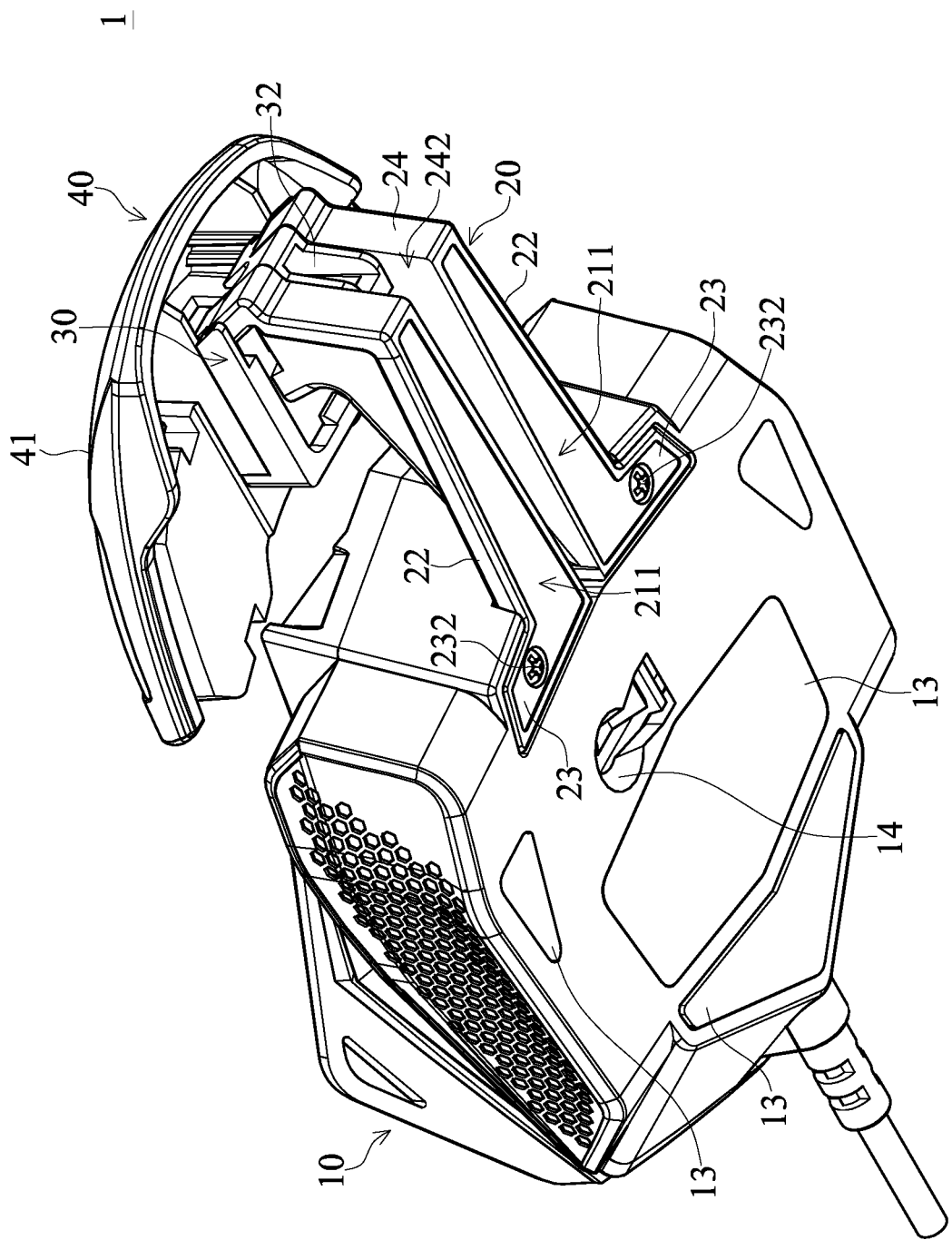
FIG. 2 is a perspective assembly view of the mouse having the movable palm rest from a different angle in the present disclosure.

With reference to FIG. 1 and FIG. 2, a mouse with a movable palm rest is provided in the present disclosure, and the mouse 1 includes a mouse body 10, a bracket 20, a connector 30 and the movable palm rest 40.

A longitudinal direction C is defined along the mouse. The mouse body 10 is located at a front side of the mouse 1 and along the longitudinal direction C. The mouse body 10 has a top surface and a bottom surface, and the top surface is opposite to the bottom surface. The mouse body 10 includes a plurality of buttons 11, at least one roller 12, a plurality of contacting pads 13 and at least one optical sensor 14. The buttons 11 are disposed on the top surface of the mouse body 10. The at least one roller 12 can be pressed or rolled by the fingers of the user. A flat portion is formed at the bottom surface of the mouse body 10, and the contacting pads 13 are disposed on the flat portion so as to contact a table or a mouse pad to reduce a friction between the mouse 1 and the table or the mouse pad. The optical sensor 14 is disposed at the bottom surface of the mouse body 10 and configured to detect the shifting motion of the mouse 1.

The bracket 20 is connected to a rear side of the mouse body 10 and extends along the longitudinal direction C from the rear side of the mouse body 10 and away from the mouse body 10. In the present embodiment, the bracket 20 includes two substrates 21 and a rib 22. The rib 22 is disposed at a center of the bracket 20, extends along the longitudinal direction C, and protrudes upward. The two substrates 21 are respectively formed at and extend from two bottom sides of the rib 22. A contacting surface 211 is formed at the bottom surface of the two substrates 21. The contacting surface 211 and the bottom surface of the mouse body 10 are coplanar with each other. Therefore, the contacting surface 211 and the bottom surface of the mouse body 10 are both able to be in contact with the table or the mouse pad when the mouse 1 is placed on the table or the mouse pad.

Figure 3:
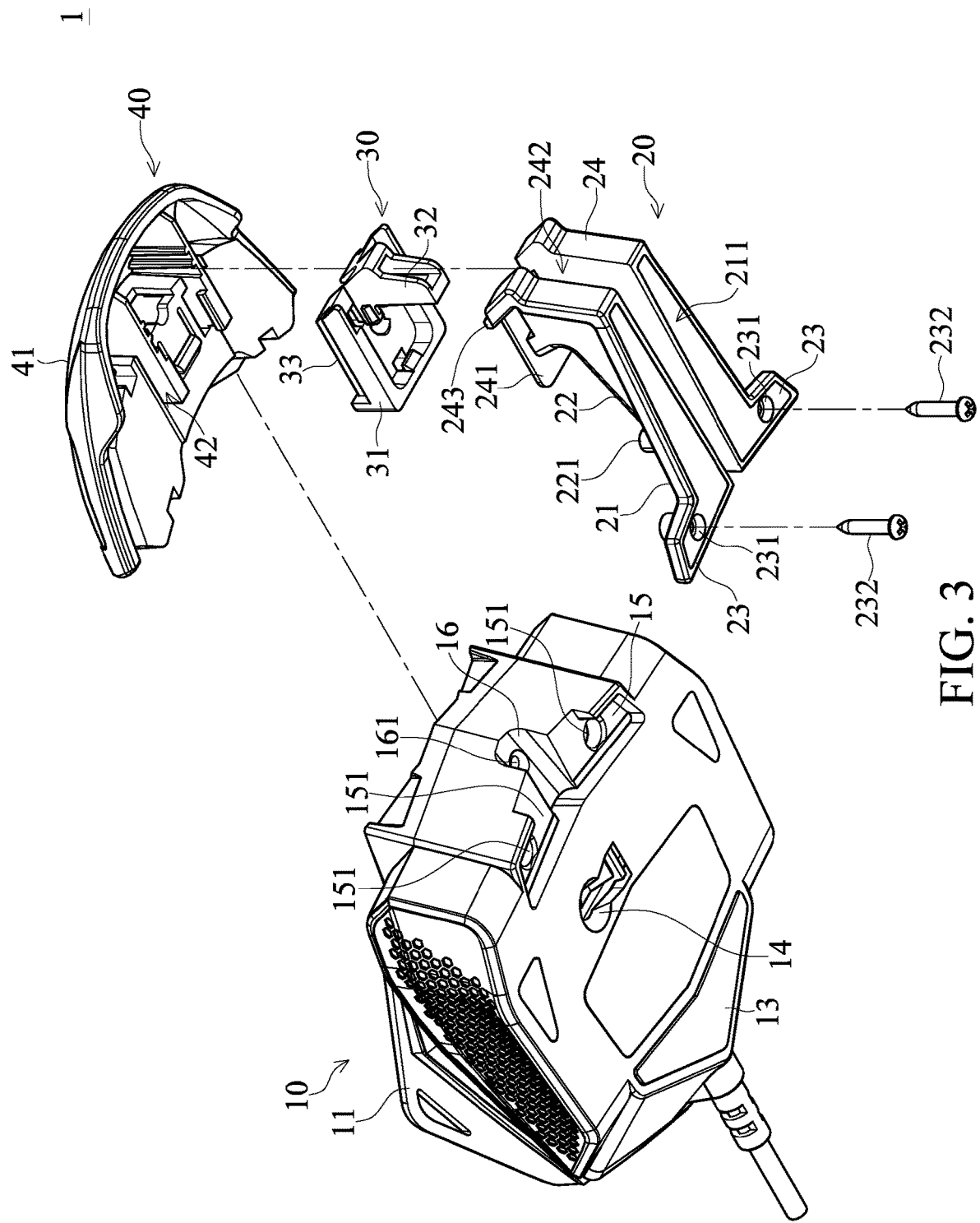
FIG. 3 is a perspective exploded view of the mouse having the movable palm rest in the present disclosure.
Figure 4:
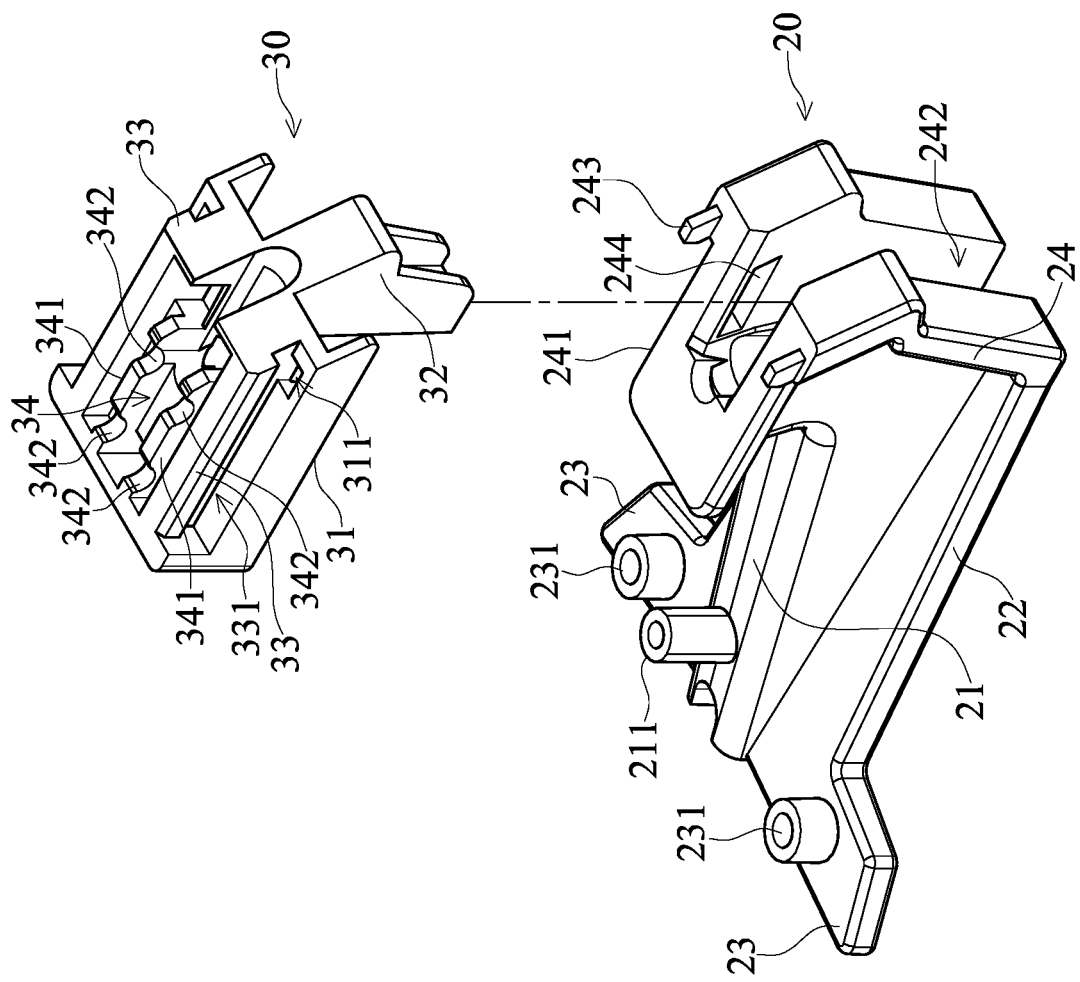
FIG. 4 is a perspective exploded view of a bracket and a connector in the present disclosure.
Figure 5:
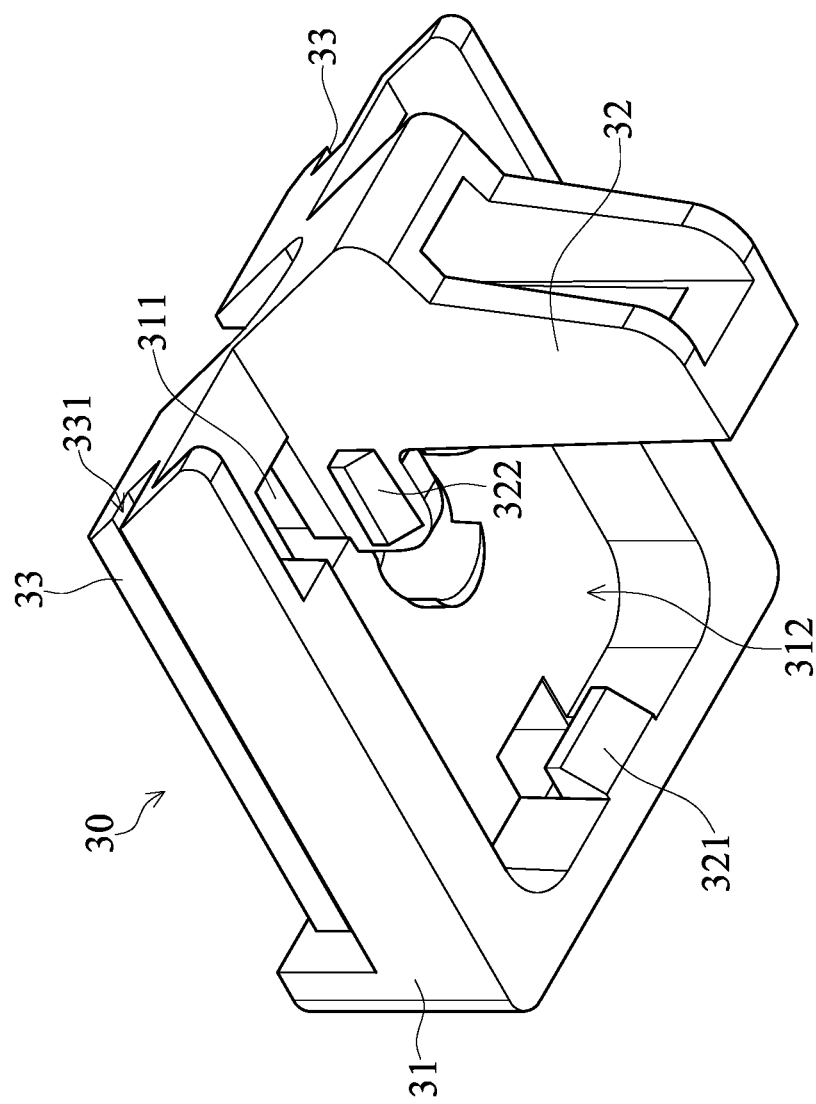
FIG. 5 is a perspective bottom view of the connector in the present disclosure.

With reference to FIG. 3, FIG. 4 and FIG. 5, the bracket 20 further includes two extending plates 23 disposed at two front ends of the bracket 20, and the two extending plates 23 are symmetrical to each other. The two extending plates 23 extend along a direction perpendicular to the longitudinal direction C and are connected to an outer side of the two substrates 21. A T shape is approximately formed at a front end and the bottom side of the bracket 20. Two screw through-holes 231 are respectively disposed on the two extending plates 23 and allow for a screw 232 to pass through. The rib 22 includes a protruding post 221 disposed at a top surface of a front end of the rib 22.

With reference to FIG. 3, the mouse body 10 further includes two transverse grooves 15 and a longitudinal groove 16. The two transverse grooves 15 are disposed at the bottom surface of the mouse body 10 and close to the rear side of the mouse body 10, and a shape of the two transverse grooves 15 corresponds with the shape of the two extending plates 23. The vertical groove 16 is located between the two transverse grooves 15, and the shape of the vertical groove 16 corresponds with the shape of the front end of the rib 22. The two extending plates 23 are able to be embedded within the two transverse grooves 15 and the front end of the rib 22 is able to be embedded within the vertical groove 16, so that the front end of the bracket 20 is able to be coupled and positioned at the rear side of the mouse body 10.

In addition, a positioning hole 161 is formed and located at the vertical groove 16 of the mouse 10 and the position of the positioning hole is corresponding to the position of the protruding post 221. When the front end of the rib 22 is embedded within the vertical groove 16, the protruding post 221 is engaged within the positioning hole 161. Two screw holes 151 are formed and located within the two transverse grooves 15, and the position of the two screw holes 151 corresponds to the position of the two screw through-holes 231. When the two extending plates 23 are embedded within the two transverse grooves 15, two screws 232 are respectively and threadedly locked into the two screw through-holes 231 and the screw holes 151, and the two extending plates 23 are fixed within the two transverse grooves 15.

Figure 6:
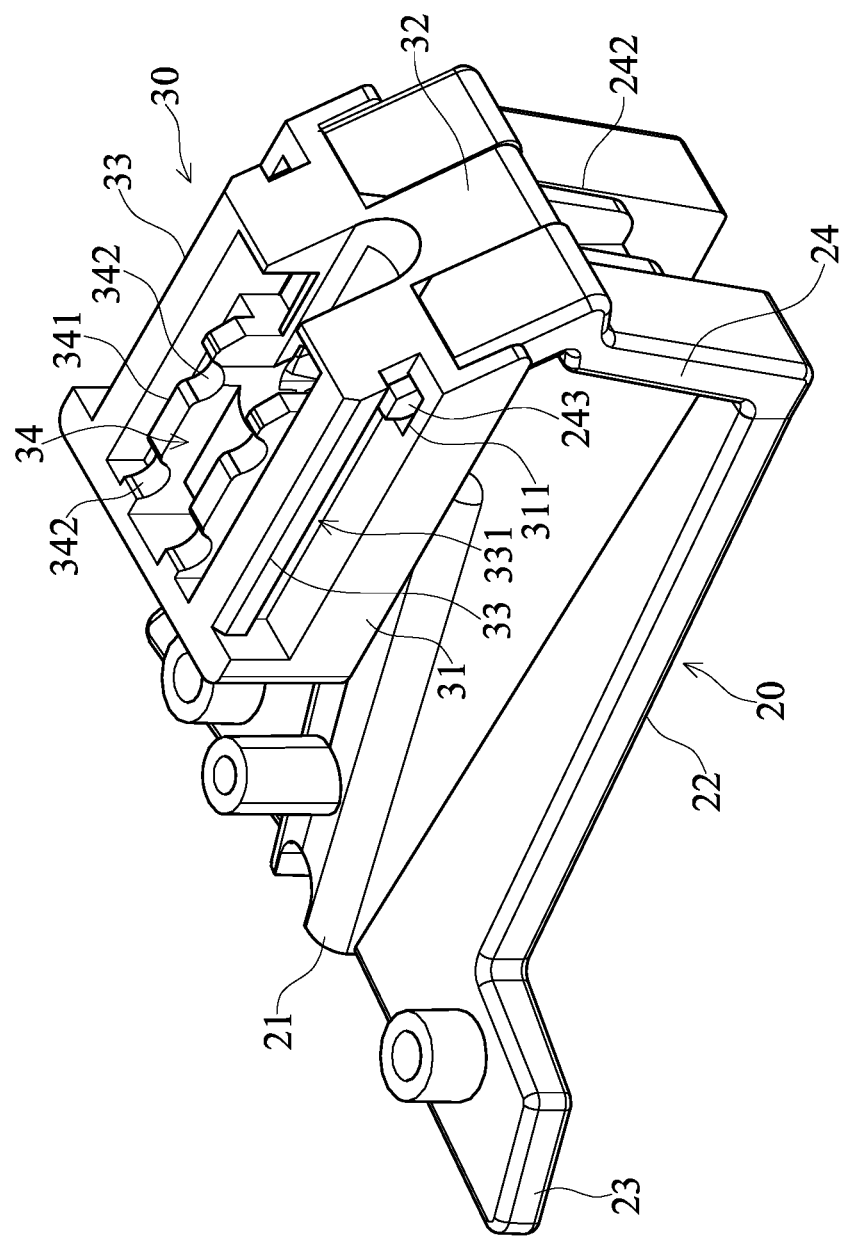
FIG. 6 is a perspective assembly view of the bracket and the connector in the present disclosure.

With reference to FIG. 4, FIG. 5 and FIG. 6, the bracket 20 further includes a bending portion 24. The bending portion 24 is formed along the longitudinal direction and at the rear end of the bracket 20 and extends upward. The bending portion 24 includes a flat portion 241, a slot 242, a stopping member 243 and two engaging grooves 244. The flat portion 241 is disposed on a top end of the bending portion 24 and the slot 242 is disposed at the rear lateral side of the bending portion 24. The slot 242 extends from the top end to a bottom end of the rear surface of the bending portion 24. As shown in FIG. 4, two lateral walls of the grooves 242 are parallel to each other, and the two engaging grooves 244 are formed and located at the two lateral walls of the slot 242 and close to the top of the bending portion.

The connector 30 is disposed at the top end of the bending portion 24 of the bracket 20. As shown in FIG. 5, the connector 30 includes a connector body 31 and a plug-in portion 32. An embedding groove 312 is formed at the bottom of the connector body 31, and the shape of the embedding groove 312 corresponds with the shape of the flat portion 241 so as to complementarily cover onto the flat portion 241. The plug-in portion 32 is disposed at the bottom surface and the rear side of the connector body 31 and extends downward. The position of the plug-in portion 32 corresponds to the position of the slot 242, and the width of the plug-in portion 32 is slightly smaller than the width of the slot 242. When the connector 30 is disposed at the top end of the bending portion 24, the embedding groove 312 complementarily covers onto the flat portion 241, and the plug-in portion 32 is inserted into the slot 242. Therefore, by the cooperation of the embedding groove 312, the plug-in portion 241 and the slot 242, the connector 30 can be precisely positioned on the bending portion 24.

In addition, in order to allow the connector 30 and the top end of the bending portion to be coupled together, a first engaging protrusion 321 is disposed at the front end of an inner lateral wall of the embedding groove 312 of the connector body 31, and two second engaging protrusions 322 are disposed at the top end of the two lateral walls of the plug-in portion 32. The first engaging protrusion 321 horizontally protrudes from the front lateral wall of the embedding groove 312 and the position of the first engaging protrusion 321 corresponds to the front lateral edge of the flat portion 241, so that the first engaging protrusion 321 can be coupled to the flat portion 241. The position of the two second engaging protrusions 322 correspond to the position of the two engaging grooves 244, so that the two second engaging protrusions 322 can be engaged within the two engaging grooves 244, and the connector 30 can be fixed and coupled to the top surface of the bending portion 24.

With reference to FIG. 2, FIG. 8, FIG. 9, FIG. 10 and FIG. 11, the movable palm rest 40 is disposed on the top end of the bending portion 24 of the bracket 20 through the connector 30, and a first sliding component 33 and a second sliding component 42 are disposed between the movable palm rest 40 and the connector 30. The first sliding component 33 and the second sliding component 42 are capable of being slidingly coupled to each other, and a movement path is defined by the first sliding component 33 and the second sliding component 42. Therefore, by the cooperation of the first sliding component 33 and the second sliding component 42, the movable palm rest 40 can be guided to move forward and backward along the movement path, and the distance between the movable palm rest 40 and the mouse body 10 will be changed accordingly when the movable palm rest 40 is moved backward and forward along the movement path.

In the present embodiment, the number of the first sliding components 33 is two, and the two first sliding components 33 are respectively disposed at two sides of the connector 30 and respectively include a sliding groove 331. The second sliding component 42 is disposed at the bottom surface of the movable palm rest 40. In the present embodiment, the number of the second sliding components 42 is two, and the shape of the cross section of the two second sliding components 42 is roughly an L shape. The two second sliding components 42 respectively include a connecting portion 421 formed on the bottom surface of the movable palm rest 40, and an engaging portion 422 formed at the bottom end of the connecting portion 421.

Figure 8:
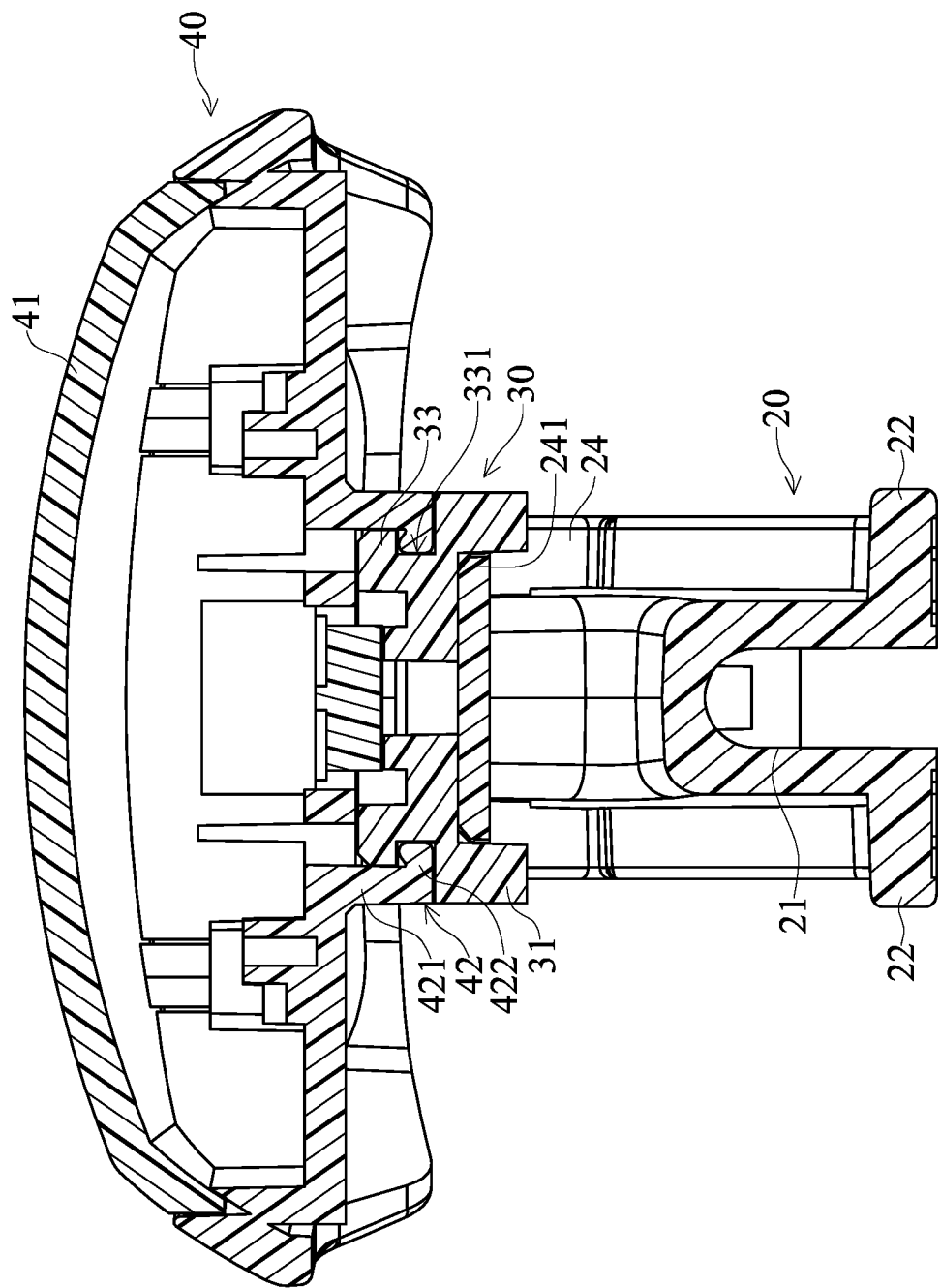
FIG. 8 is a sectional view of an assembly of the movable palm rest, the connector and the bracket in the present disclosure.

As shown in FIG. 8, the two connecting portions 421 are disposed at the bottom surface of the movable palm rest 40 and correspond to the outer side of the two first sliding components 33. The two engaging portions 422 are respectively disposed at the bottom end of the two connecting portions 421, face toward one side of the first sliding component 33, and extend to the two first sliding components 33. The height position of the two engaging portions 422 corresponds to the height of the two first sliding components 33, so that the two engaging portions 422 are engaged within the two sliding grooves 331 and capable of being slid backward and forward within the two sliding grooves 331 when the two second sliding components 42 and the two first sliding components 33 are coupled to each other. Therefore, the two second sliding components 42 and the two first sliding components 33 can be coupled together and slid relative to each other.

Moreover, as shown in FIG. 4 and FIG. 6, an opening is formed at one end of the two sliding grooves 331, and the engaging portion 422 of the second positioning component 42 can be disposed within the two sliding grooves 331 through the opening of the sliding groove 331. In order to avoid detaching the two engaging portions 422 from the two sliding grooves 331, two stopping members 243 are disposed at the opening of the two sliding grooves 331 and used to prevent the two engaging portions 422 from being released from the two sliding grooves 331. As shown in FIG. 4, in the present embodiment, the opening of the two sliding grooves 331 is located at the rear side of the connector 30, and the stopping member 243 is integrally disposed at the rear side of the flat portion 241 and located at the two lateral sides of the slot 242. Two through-hole portions 311 are disposed at the rear side of the connector body 31, located at two sides of the plug-in portion 32 and corresponding to the positions of the two stopping members 243. As shown in FIG. 6, when the connector 30 is disposed at the top of the bending portion, the top ends of the two stopping members 243 are protruded from the top of the two through-hole portions 311, and the top ends of the two stopping members 243 can exactly block the opening of the two sliding grooves 331. Therefore, the two stopping members 243 interfere with the rear side of the engaging portion 422 of the two second sliding components 42 to obstruct movement, so as to prevent the engaging portion 422 of the two second sliding components 42 from detaching from the two sliding grooves 331.

It should be noted that, in the present embodiment, the first sliding component 33 and the second sliding component 42 are arranged in a straight line, and the movement path defined by the first sliding component 33 and the second sliding component 42 is also a straight path, which is roughly parallel to the longitudinal direction C. However, in a different embodiment of the present disclosure, the first sliding component 33 and the second sliding component 42 can be arranged differently than in a straight line (e.g., a curve line), and the movement path may not be parallel to the longitudinal direction, and is not limited to being a straight movement path.

In addition, in the present embodiment, although the first sliding component 33 is disposed on the connector 30 and the second sliding component 42 is disposed on the movable palm rest 40, the location of the installation of the first sliding component 33 and the second sliding component 42 can be changed according to practical requirements in other embodiments of the present disclosure.

With reference to FIG. 6, FIG. 7, FIG. 9, FIG. 10 and FIG. 11, a first positioning component 34 and a second positioning component 43 are also disposed between the movable palm rest 40 and the connector 30. When the movable palm rest 40 is disposed on the connector 30, the first positioning component 34 is contacted with the second positioning component 43, and the movable palm rest 40 is selectively disposed at a plurality of positioning locations along the movement path.

Figure 7:
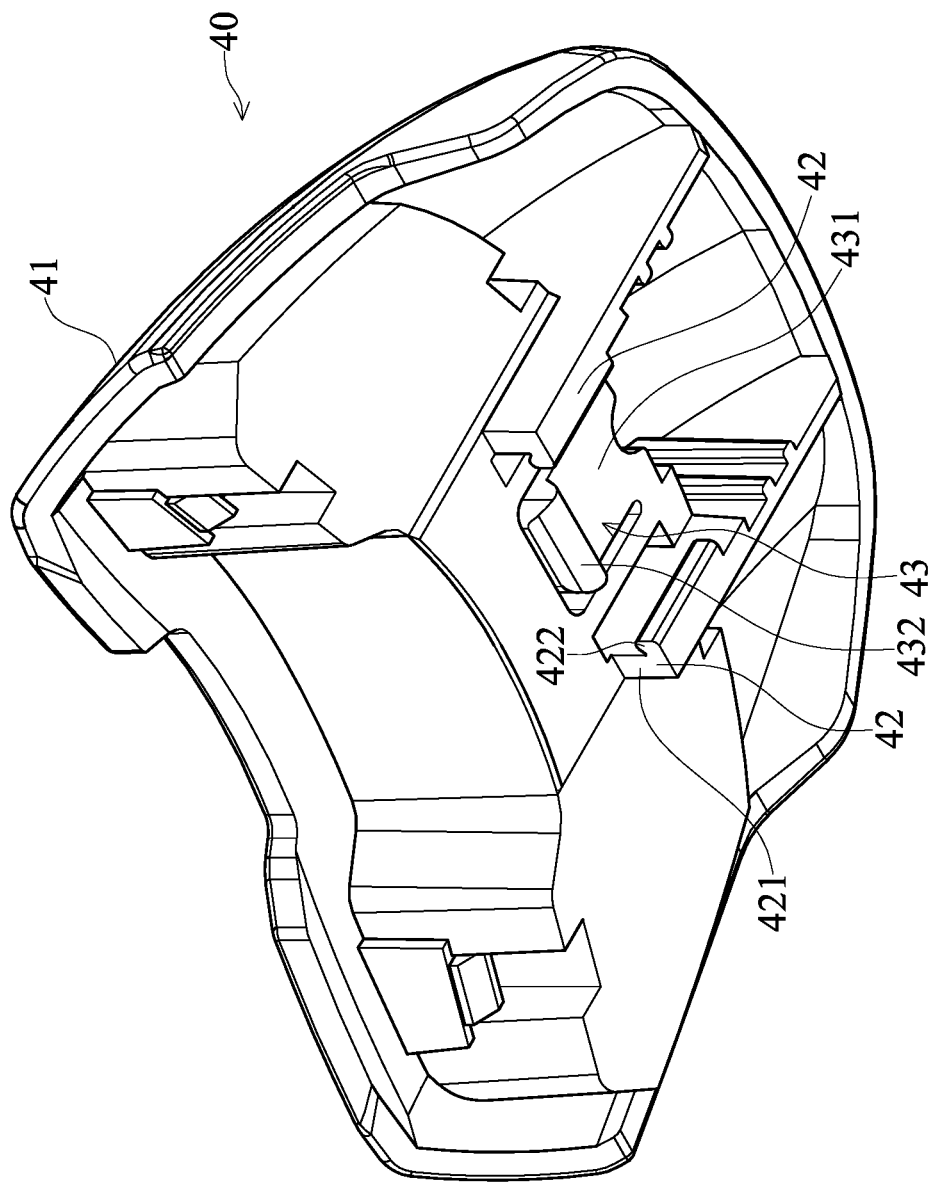
FIG. 7 is a perspective bottom view of a movable palm rest in the present disclosure.

As shown in FIG. 6, in the present embodiment, the first positioning component 34 is disposed on the top surface of the connector 30 and includes at least one positioning base 341 and a plurality of positioning grooves 342. The positioning grooves 342 are spaced apart from each other along the movement path at one side of the positioning base 341, and face the second positioning component 43. As shown in FIG. 7, in the present embodiment, the second positioning component 43 is disposed at the bottom surface of the movable palm rest 40 and includes an elastic member 431 and a positioning protrusion 432. The elastic member 431 is an elastic piece, and one end of the elastic member 431 is a fixed end connected to the bottom of the movable palm rest 40, and the other end of the elastic member 431 is a movable end. The positioning protrusion 432 is disposed at the movable end of the elastic member 431 and protruded toward the first positioning component 34.

As shown in FIG. 9, FIG. 10 and FIG. 11, the shape of the positioning protrusion 432 corresponds to the shape of the positioning groove 342, so that the positioning protrusion 432 can be engaged within the positioning grooves 342. The first sliding component 34 and the second sliding component 43 are designed such that the positioning protrusion 432 of the second positioning component 43 interferes with the top surface of the positioning base 432 of the first positioning component 34 to obstruct movement when the movable palm rest 40 is disposed on the connector 30. The positioning protrusion 432 is able to be in abutting contact with the top surface of the positioning base 341 through the elastic force of the elastic member 431. Therefore, as shown in FIG. 9 and FIG. 11, when the positioning protrusion 432 is moved along with the movable palm rest 40 to one of the corresponding positioning grooves 342, the positioning protrusion 432 can be engaged into the corresponding positioning groove 342 by the elastic push of the elastic member 431. Therefore, the positioning protrusion 432 is selectively engaged into one of the positioning grooves 342 to position the movable palm rest 40 at different positioning locations.

Moreover, as shown in FIG. 10, in the present embodiment, the surfaces of the positioning protrusion 432 and the positioning grooves 342 are designed to be arc-shaped. Therefore, after the positioning protrusion 432 is engaged into one of the engaging grooves 342, the user can push the movable palm rest 40 to force the positioning protrusion 432 to release from the corresponding positioning groove 342 so as to bend the elastic member 431. When the positioning protrusion 432 is moved and positioned to another one of the positioning grooves 342, the positioning protrusion 432 will be engaged into another one of the positioning grooves 342 by the elastic force of the elastic member 431.

In summary, according to the mouse having a movable palm rest in the present disclosure, the user can adjust the position of the movable palm rest 40 along the movement path defined by the first sliding component 33 and the second sliding component 42 to change the distance between the movable palm rest 40 and the mouse body 10. By the cooperation of the first positioning component 34 and the second positioning component 43, the movable palm rest 40 can be positioned at different positioning locations and the user can adjust the movable palm rest 40 to different positioning locations according to the size of the palm or usage habits so as to enhance the usage comfort of the mouse.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse having a movable palm rest, comprising:
a mouse body disposed at a front end of the mouse, and including a top surface, a bottom surface, a front side and a rear side, the top surface being opposite to the bottom surface, and the front side being opposite to the rear side;
a bracket connected to the rear side of the mouse body and extending along a longitudinal direction of the mouse from the rear side of the mouse body and away from the mouse body, and having a contacting surface at a bottom surface of the bracket, the contacting surface and the bottom surface of the mouse body being coplanar;
a connector disposed at a rear end of the bracket;
the movable palm rest connected to the connector;
a first sliding component and a second sliding component, the first sliding component being disposed on one of the movable palm rest and the connector, the second sliding component being disposed on the other one of the movable palm rest and the connector, and the first sliding component and the second sliding component capable of being slidingly coupled together, and the first sliding component and the second sliding component defining a movement path and guiding the movable palm rest to move forward and backward along the movement path, so as to change a distance between the movable palm rest and the mouse body; and
a first positioning component and a second positioning component, the first positioning component being disposed on one of the movable palm rest and the connector, the second positioning component being disposed on the other of the movable palm rest and the connector, and the first positioning component and the second positioning component capable of cooperating with each other to selectively position the movable palm rest at a plurality of positioning locations on the movement path.

2. The mouse having the movable palm rest according to claim 1, wherein the first positioning component includes at least one positioning base and a plurality of positioning grooves, and the positioning grooves are spaced apart from each other on the positioning base and are disposed along the movement path facing one side of the second positioning component, and the second positioning component includes an elastic member and a positioning protrusion, when the movable palm rest is disposed on the connector, the positioning protrusion interferes with movement of the positioning base and abuttingly contacts the positioning base through the elastic member, so as to be engaged within one of the positioning grooves.

3. The mouse having the movable palm rest according to claim 2, wherein the elastic member is an elastic piece, a first end of the elastic member is a fixed end, and a second end of the elastic member is a movable end, and the positioning protrusion is disposed at the movable end of the elastic member and protrudes in a direction toward the first positioning component.

4. The mouse having the movable palm rest according to claim 3, wherein the first sliding component includes at least one sliding groove and the second sliding component includes at least one coupling portion, and the at least one coupling portion and the at least one sliding groove are slidingly coupled together.

5. The mouse having the movable palm rest according to claim 4, wherein one end of the at least one sliding groove includes an opening, the coupling portion can be disposed within the at least one sliding groove from the opening of the at least one sliding groove, and a stopping member is disposed at the opening of the at least one sliding groove to interfere with the at least one coupling portion so as to prevent the coupling portion from being detached from the at least one sliding groove.

6. The mouse having the movable palm rest according to claim 1, wherein the bracket includes a bending portion disposed at a rear end of the bracket, the bending portion is bended upward, and the connector and the movable palm rest are disposed on a top end of the bending portion.

7. The mouse having the movable palm rest according to claim 6, wherein the bracket includes a rib disposed at a center of the bracket, the rib extends along the longitudinal direction of the mouse and protrudes upward, and two bottom plates are formed at and extend from two bottom sides of the rib, and the contacting surface is formed at bottom surfaces of the two bottom plates.

8. The mouse having the movable palm rest according to claim 7, wherein the bracket further includes two extending plates disposed at two sides of the bracket, the two extending plates are symmetrical to each other and extend along a direction perpendicular to the longitudinal direction at outer sides of the two bottom plates; the mouse body further includes two transverse grooves and a longitudinal groove, the two transverse grooves are disposed at the bottom surface of the mouse body and close to the rear side of the mouse body, a shape of the two transverse grooves corresponds to the shape of the extending plates, the vertical groove is disposed at the bottom surface of the mouse body and between the two transverse grooves, the two extending plates are able to be embedded within the two transverse grooves, and a front end of the rib is able to be embedded within the vertical groove.

9. The mouse having the movable palm rest according to claim 8, wherein the rib further includes a protruding post disposed on a top surface of the front end of the rib, the two transverse grooves include a positioning hole corresponding to a position of the protruding post, the two extending plates respectively include a screw through-hole, the two transverse grooves respectively include a screw hole corresponding to the screw through-hole, the protruding post is able to be coupled to the positioning hole, and a screw is respectively locked into the screw through-hole and the screw hole to fix the two extending plates within the two transverse grooves when the rib and the two extending plates are embedded within the vertical groove and the two transverse grooves.

10. The mouse having the movable palm rest according to claim 9, wherein the bending portion further includes:
a flat portion disposed on a top surface of the bending portion; and
a slot located at a rear side of the bending portion; and the connector further includes:
an embedding groove located at the bottom of the connector, and a shape of the embedding groove corresponds with the shape of the flat portion; and
a plug-in portion disposed at a rear bottom surface of the connector, and a position of the plug-in portion corresponds to the position of the slot;
wherein when the connector is disposed on the top end of the bending portion, the embedding groove covers onto the flat portion, and the plug-in portion is inserted into the slot.

* * * * *